United States Patent

[11] 3,542,377

[72] Inventor Robert M. Voitik
 Glenview, Illinois
[21] Appl. No. 713,593
[22] Filed March 18, 1968
[45] Patented Nov. 24, 1970
[73] Assignee Rex Chainbelt Inc.
 a corporation of Wisconsin. by mesne
 assignment

[54] SECONDARY SEAL WITH SPRAGS
 4 Claims, 5 Drawing Figs.
[52] U.S. Cl. .................................................. 277/92,
 277/42, 277/207
[51] Int. Cl. .................................................. F16j 15/54
[50] Field of Search .......................................... 277/9,
 38—43, 92, 206.1, 207, ATD

[56] References Cited
UNITED STATES PATENTS
2,299,395 10/1942 Karlberg ...................... 277/92
3,241,844 3/1966 Morley ........................ 277/92
3,272,519 9/1966 Voitik .......................... 277/206X Primary Examiner—Laverne D. Geiger
Assistant Examiner—Jeffrey S. Mednick
Attorney—Wolfe, Hubbard, Voit and Osann ABSTRACT: A secondary seal ring for loading and sealing a large diameter radial sealing member, with the ring having integral sprags for releasably locking the ring and the sealing member it supports within an annular mounting seat.

Patented Nov. 24, 1970 3,542,377
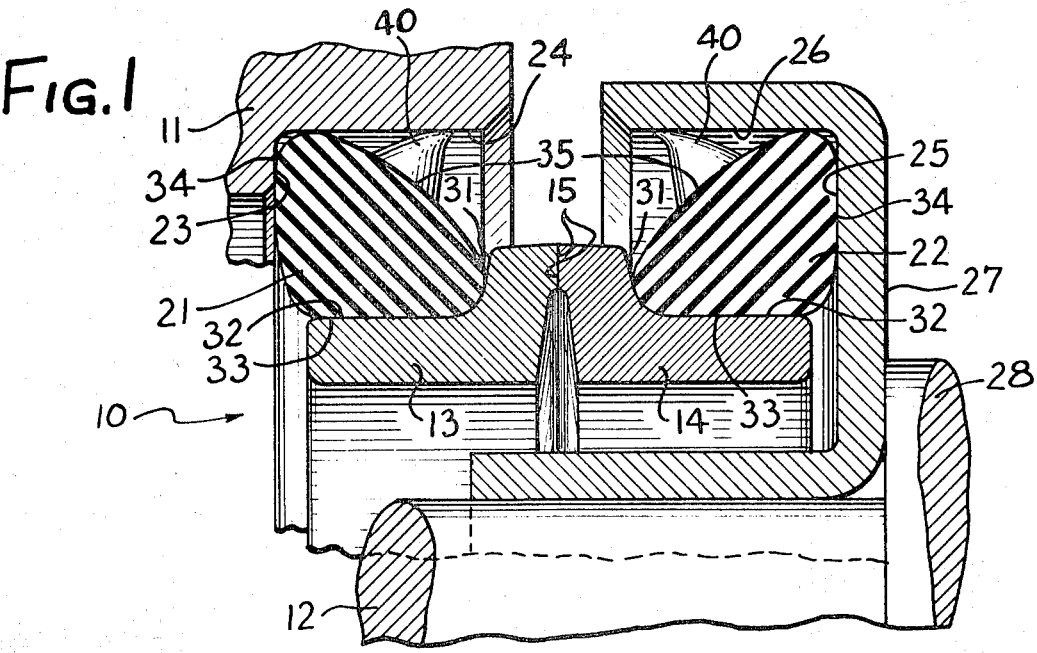
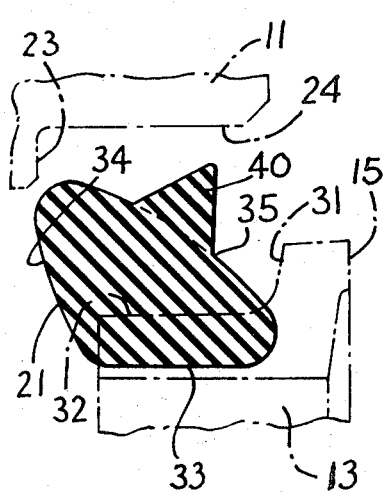
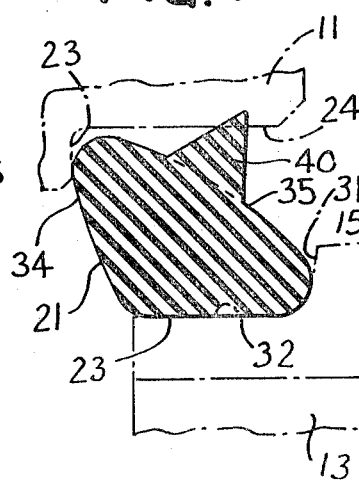
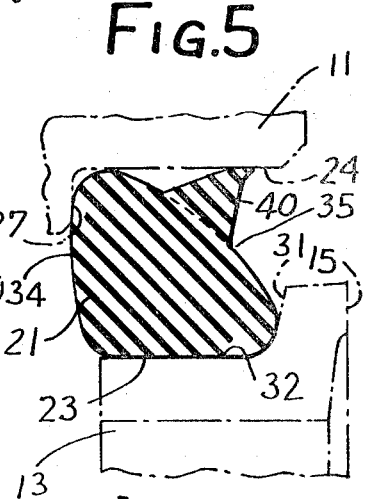
INVENTOR
ROBERT M. VOITIK
by Wolfe, Hubbard, Voit & Osann
ATTYS.

SECONDARY SEAL WITH SPRAGS

DESCRIPTION OF THE INVENTION

This invention relates generally to radial seals for rotating members and more particularly concerns a resilient secondary sealing element for such seals.

An object of the invention is to provide an improved resilient secondary sealing ring that solidly holds the sealing member in proper position under proper loading while affording axial flexibility.

Another object is to provide a ring as characterized above which can be easily installed and yet is capable of releasably holding a relatively large and heavy sealing element in place during further assembly of the seal.

A further object is to provide a ring of the above kind which is economical to form and which is of a design that can be readily adapted to special requirements or configurations of the assembly to be sealed.

Other objects and advantages of the invention will become apparent upon reading the following detailed description and upon reference to the drawings, in which:

FIG. 1 is a fragmentary axial section of a seal assembly embodying the present invention;

FIG. 2 is a fragmentary elevation of the sealing rings used in the assembly of FIG. 1; and FIGS. 3, 4 and 5 are axial sections of the ring shown in FIG. 2 during various stages of seal assembly with the parts cooperating with the ring being shown in dashed lines.

While the invention will be described in connection with a preferred embodiment, it will be understood that I do not intend to limit the invention to that embodiment. On the contrary, I intend to cover all alternatives, modifications and equivalents as may be included within the spirit and scope of the invention as defined by the appended claims.

Turning to the drawing, there is shown a seal 10 embodying the invention and providing a fluid barrier between two relatively rotatable parts which, in this case, are a housing 11 and a shaft 12. The seal 10 includes a pair of sealing elements 13 and 14 having abutting sealing surfaces 15. The element 14 rotates with the shaft and the element 13 is mounted in the housing 11.

The sealing elements 13, 14 are supported, and their surfaces 15 are urged together, by resilient secondary sealing rings 21 and 22 which are identical but reversed left to right. The ring 21 mounts the element 13 in an annular seat defined by a radial surface 23 and an inner cylindrical surface 24 formed on the housing 11. The ring 22 mounts the element 14 in an annular seat defined by a radial surface 25 and an inner cylindrical surface 26 formed by a cup 27. The cup 27 is secured for rotation with the shaft 12 and abuts a collar 28 on the shaft so that the cup 27 cannot move axially on the shaft. Each of the elements 13, 14 is formed with a radial surface 31 and an outer cylindrical surface 32 facing the respective seats of the housing 11 and the cup 27.

Pursuant to the invention, the rings 21, 22 are annular bodies of resilient material having a substantially triangular axial section with one leg 33 of the section abutting the outer cylindrical surface 32 and the other leg 34 abutting the respective radial surfaces 23, 25 of the seats. Preferably, the hypotenuse of each axial section is defined by a generally conical surface 35 which lies at an approximate 45° angle with respect to the cylindrical surfaces 24, 26, 32. The surfaces of the rings 21, 22 which define the legs 34 are rounded so that urging the radial surfaces 31 toward the respective radial surfaces 23, 25 causes tilting of the hypotenuse surfaces 35 toward the radial and rolling of the rounded surfaces 34 on the seat radial surfaces 23, 25.

In carrying out the invention, the rings 21, 22 are formed with a plurality of resilient sprags 40 extending from the conical hypotenuse surfaces 35, the sprags 40 being disposed about the periphery of the rings 21, 22 and being angled with respect to, and deflected against, the inner cylindrical surfaces 24, 26 so as to resist movement of the rings 21, 22 away from the radial seat surfaces 23, 25. In the illustrated form, the sprags 40 are conical protrusions formed integrally with the rings 21, 22, and the sprags preferably lie at an angle of about 30° from the radial plane of the ring.

FIGS. 3 to 5 show the successive shapes of the ring 21 as the seal 10 is installed and, of course, the ring 22 acts correspondingly. In the relaxed state, FIG. 3, the inner diameter of the ring 21 defined by the surface 33 is less than the diameter of the cylindrical surface 32 of the sealing element seat. Thus, when the ring is stretched to embrace the sealing element 13 (FIG. 4), the ring 21 resiliently grips the surface 32 of the element 13. With the ring 21 on the element 13, the diameter of the inner cylindrical surface 24 of the seat in the housing 11 is less than outer diameter of the ring (FIG. 4) so that the sprags 40 are deflected when the ring and the element are inserted into the housing seat. Finally, when the sealing faces 15 of the two elements 13, 14 are forced together and the element radial surface 31 is urged toward the seat radial surface 23 (FIG. 5), the hypotenuse defining surface 35 is tilted and the surface 34 rolled into firm contact with the seat radial surface 23.

Now that the design of the seal 10 is appreciated, the several advantages of that design can be seen. The sprags 40 hold the sealing elements 13, 14 within their seats during assembly and disassembly of the seal. The sprags require little material, bend freely to insert the rings 21, 22 into the seat inner cylindrical surfaces 24, 26 and firmly resist removal of the rings 21 from the seats. To give a representative case, a sealing ring 10 inches in diameter formed with 80 sprags was found to require 9 pounds of force to insert the sealing ring into its seat, but 20 pounds to remove the ring because of the increased gripping effect of the sprags. Tests have also shown that the 30° angle of the sprags 40 gives a maximum ratio of holding force versus insertion force.

It can also be appreciated that if the seat configuration had some special shape or discontinuity in the cylindrical surface 24, the shape or length of the sprags 40 could be modified to meet the problem effectively. After installation, the sprags have little or no effect on loading of the sealing rings 13, 14.

The triangular shape of the rings 21, 22 affords a solid truss-like section firmly holding the rings 13, 14 concentrically in their seats. Those familiar with this art will appreciate that the truer radial sealing rings run, the better the seal performance and life. The rolling action of the edges 34 accompanied by the tilting of the hypotenuse surfaces 35 upon axial movement of the sealing elements 13, 14 into their supporting seats keeps the axial loading on the sealing faces 15 about uniform through a considerable range of axial movement between the housing 11 and the shaft 12. The tilting sealing rings 21, 22 exert a camming kind of axial force on the elements 13, 14 which is different from resilient compression, and thus the axial loading tends to remain uniform despite "set" of the resilient material making up the rings such as might be caused by high temperatures or substantial forces.

The relatively flat conical surfaces 35 defining the hypotenuse of the ring sections, together with the spaced sprags 40, tend to dislodge mud trying to force its way past the seal 10—as from the top down in FIG. 1. The surfaces 34 lie generally parallel to the lines of load in the body of the rings 21, 22 so that load changes upon axial movement tend to wrinkle or flex the surfaces and break loose mud. The sprags 40 also keep larger particles of foreign material from being wedged between the rings 21, 22 and their surrounding seats.

It will be understood that in this specification and the following claims, the term "axial section" means a section lying in the plane of the axis of an annular member, and such a plane also inherently extends radially. The term "radial plane" means a plane extending transversely of the axis of an annular member containing all of the radii of that member.

I claim:

1. In a seal, the combination comprising, an outer annular member having a seat with a radially extending surface joining an inner cylindrical surface, a sealing element with a radially extending surface and an outer cylindrical surface facing the seat, a secondary sealing ring comprising an annular body of resilient material, said body having a substantially triangular axial section bounded by two adjoining legs and a hypotenuse with one leg of the section engaging said sealing element along a substantial portion of said outer cylindrical surface thereof and the other leg of the section extending radially and abutting said seat radial surface, the annular surface of said body between said other leg and said hypotenuse being rounded so that urging said radial surfaces together causes the sealing element radial surface to tilt the hypotenuse of said section and roll said rounded annular surface on said seat radial surface, and a plurality of resilient sprags formed on said ring extending from the conical surface defining said hypotenuse, said sprags being disposed about the periphery of said ring and being angled with respect to, and deflected against, said inner cylindrical surface so as to resist movement of the ring away from said seat radial surface.

2. The ring of claim 1 in which the hypotenuse of said section lies at an approximate 45° angle with respect to said cylindrical surfaces.

3. The ring of claim 1 in which the relaxed inner diameter of said resilient ring is less than the diameter of said outer cylindrical surface so that the ring resiliently grips the sealing element, and the diameter of said inner cylindrical surface is less than the outer diameter of said ring when the ring is on said element so that the ring resiliently holds the sealing element within and concentric with the inner cylindrical surface.

4. The ring of claim 1 in which said sprags are conical protrusions formed integrally with said ring and said protrusions lie at an angle of about 30° from the radial plane of the ring.